(12) United States Patent
Sales I Casals

(10) Patent No.: US 7,352,936 B2
(45) Date of Patent: Apr. 1, 2008

(54) OPTICAL AERIAL LINE AND METHOD OF INSTALLATION THEREOF

(75) Inventor: Lluis Sales I Casals, Viver I Serrateix (ES)

(73) Assignee: Prysmian Cables y Sistemas, S.L., Vilanova I La Geltru (ES)

( * ) Notice: Subject to any disclaimer, the term of this patent is extended or adjusted under 35 U.S.C. 154(b) by 127 days.

(21) Appl. No.: 10/555,908

(22) PCT Filed: Apr. 26, 2004

(86) PCT No.: PCT/IB2004/001492

§ 371 (c)(1),
(2), (4) Date: Nov. 7, 2005

(87) PCT Pub. No.: WO2004/099840

PCT Pub. Date: Nov. 18, 2004

(65) Prior Publication Data

US 2007/0009215 A1    Jan. 11, 2007

(30) Foreign Application Priority Data

May 6, 2003    (ES) ................................ 200301131

(51) Int. Cl.
*G02B 6/44* (2006.01)

(52) U.S. Cl. .................... 385/101; 385/100; 385/102
(58) Field of Classification Search ......... 385/100–101
See application file for complete search history.

(56) References Cited

U.S. PATENT DOCUMENTS

| 4,424,954 A | | 1/1984 | Innes | |
|---|---|---|---|---|
| 5,136,673 A | * | 8/1992 | Yoshizawa et al. | 385/103 |
| 5,165,003 A | * | 11/1992 | Carter | 385/112 |
| 6,032,449 A | | 3/2000 | Einsle et al. | |
| 6,127,626 A | | 10/2000 | Haag et al. | |
| 6,193,824 B1 | * | 2/2001 | Einsle et al. | 156/53 |

FOREIGN PATENT DOCUMENTS

| DE | 198 42 401 | 5/2000 |
|---|---|---|
| DE | 101 40 310 | 2/2003 |
| EP | 0 981 192 | 2/2000 |
| EP | 1 017 143 | 7/2000 |

OTHER PUBLICATIONS

R. Böhme et al., "Fibre Optic Lashed Cables on High Voltage Lines", International Wire & Cable Symposium Proceedings, pp. 642-649, (1998).

* cited by examiner

*Primary Examiner*—Frank G. Font
*Assistant Examiner*—Hung Lam
(74) *Attorney, Agent, or Firm*—Finnegan, Henderson, Farabow, Garrett & Dunner, L.L.P.

(57) ABSTRACT

An optical aerial line has an optical cable extending parallel to an aerial electrical conductor and lashed to the electrical conductor by means of securing elements, wherein the securing elements have at least two binders helically wound onto the electrical conductor and the optical cable, and wherein the number of said binders, the tension of application of said binders, and the lashing pitch are selected so as to have a binding force of at least 5 kg/m, so as to avoid lateral displacements of the optical cable.

18 Claims, 5 Drawing Sheets

OPTICAL AERIAL LINE AND METHOD OF INSTALLATION THEREOF

CROSS REFERENCE TO RELATED APPLICATIONS

This application is a national phase application based on PCT/IB2004/001492, filed Apr. 26, 2004, which claims the priority of Spanish Application No. P-200301131, filed May 6, 2003, the content of both of which is incorporated herein by reference.

BACKGROUND OF THE INVENTION

1. Field of the Invention

The invention relates to an optical aerial line and to a method of installation thereof.

2. Description of the Related Art

It is known to combine an optical communication system with aerial power system, by routing utility cables, such as telephone or data transmission cables, between selected locations as overhead wiring suspended from a series of utility poles.

Fiber optical cable links are the foundation of such communications systems, since they have the advantage of large capacity, high speed and long distance transmission, without showing any cross-talk. At the same time, they are not influenced by electromagnetic fields, which is very important for installations on High-Voltage (HV) lines.

The easiest way to connect power plants and control stations is to use the existing high voltage lines. The most common method for this is to install an Optical Ground Wire (OPGW), which contains optical fibers, as a substitution of an existing ground wire. Another possibility consists in incorporating optical fibers in a cable the replaces one of the standard phase conductors. This solution is called Optical Phase Conductor (OPPC). Besides these integrated solutions, additional cables can be installed on the towers. Self-supporting cables for additional installation on high-voltage lines are the MASS (Metallic Aerial Self-Supporting) and the ADSS (All-Dielectric Self-Supporting) cables. While these self-supporting cables are hung between the towers, the ADL (All-Dielectric Lashed) is a small sized cable that is attached to a messenger wire. In HV lines, either a ground wire or a phase conductor may serve as the messenger.

The article of R. Böhme, R. Girbig, G. Hög (Alcatel Kabel AG & Co, Mönchengladbach, Germany), "Fibre Optic Lashed Cables on High Voltage Lines", International Wire & Cable Symposium Proceedings 1998, pages 642-649, presents an overview of existing techniques for attaching a light weight dielectric optical fibre cable to an existing rope, either ground wire or phase conductor. The optical cable may be lashed onto a messenger by means of a lashing binder, wrapped onto the messenger, attached to the messenger by means of clips or clamps, or attached by means of a preformed rod.

The authors of this article consider the lashed cable technique as the one that offers more installation flexibility and allows for longer spliceless cable length than any other technique. The optical cable may be lashed to the messenger with two dielectric lashing binders, the second one being added only for safety reasons.

U.S. Pat. No. 4,424,954 (Communications Systems) relates to a device to lash a fiber optic cable to a supporting strand and tackles the problem of insufficient securing of the optical cable when a prior art cable lashing machine is used with recent fiber optic cables, which are lighter and smaller than in the past. Due to the insufficient securing, the fiber optic tends to twist around the supporting strand, and such twisting damages the insulation on the fiber optic cable and thus reduces the cable's efficiency and impulse transmitting ability. The problem is eliminated by tensioning the fiber optic cable as is passes through the lashing machine and is lashed to the supporting strand, so as to maintain it coextensive relative to the supporting strand. A lashing line is then helically wrapped around the supporting strand and the optical cable.

U.S. Pat. No. 6,193,824 (Siemens) relates to a method of installing an optical cable on a conductor of a high-voltage overhead line with the aid of securing elements applied in a helical manner, wherein a safeguard against coming off in the event of a rupture of a securing element is provided. The optical cable is fitted along the electrical conductor and secured by means of a helically-wrapped adhesive tape. A particularly secure attachment results if two adhesive tapes are applied with crossover wrapping since there is a further defined bonding between the two adhesive tapes additionally at the adhesive tape crossover points.

The Applicant notes that, although the use of adhesive tape provides a good coupling of the optical cable and the electrical conductor, problems of ageing of the adhesive can arise, which can reduce in time the effectiveness and the safety of the coupling.

The Applicant has tackled the problem of improving the tightness and the safety of a lashed coupling, avoiding the use of adhesives, which are subjected to ageing, and of cable tensioning techniques, which are difficult to implement. The Applicant has in particular tackled the problem of avoiding displacements of the optical cables after installation, due for example to wind which would affect the integrity and the performances of the optical line.

The Applicant has verified that a particularly convenient arrangement of the optical/electrical lashed assembly is to dispose the optical cable parallel to the electrical conductor and underneath the electrical conductor (in a vertical-alignment geometry). In this case, possible lateral displacements of the optical cable are undesired. The Applicant has for example observed that, in very cold environmental conditions, a lateral displacement of the optical cable with respect to the position underneath the electrical conductor would lead to an increase ice formation on the assembly, and therefore to an additional weight to be supported by the structure. Moreover, this displacement of the optical cable renders the structure more subjected to oscillations when the ice layer is detached from the assembly (galloping phenomena).

SUMMARY OF THE INVENTION

The Applicant has found that a suitable coupling of the optical cable and the electrical conductor may be achieved by opportunely selecting the type and number of securing elements, the pitch of the helical laying of the securing elements, and the tension of application of the securing elements.

In particular, the Applicant has found that displacements of the optical cable, in particular lateral displacement from the preferred position underneath the electrical conductor, can be avoided by selecting said parameters so as to have a binding force, defined as the contact pressure per length unit between optical cable and electrical conductor, greater than about 5 kg/m. A tight coupling with a sufficient number of securing elements also improves the safety of the structure.

The binding force F [kg/m] can be so expressed:

$$F = N \cdot (2T/P) \cdot \sin \alpha \cdot \cos \beta$$

where:

N is the number of binders;

T [kg] is the tension of application of the binders;

P [m] is the winding pitch of the binders;

α is the winding angle of the binder; and

β is the angle between the plane tangent to the outer surfaces of the two cables and the plane containing the longitudinal axis of said cables.

The parameter β can be in turn expressed as:

$$\beta = \text{Arc } \sin(|r_2 - r_1|/(r_1 + r_2))$$

where $r_1$ is the radius of the optical cable and $r_2$ is the radius of the electrical conductor.

The parameter α is related to the winding pitch of the binders and to the perimeter C of the 8-shaped cross section of the electrical conductor/optical cable assembly, according to the following formulas:

$$\alpha = \text{Arc tan } (C/P)$$

where:

for $r_1 \geq r_2$ $C = r_1 \cdot (\pi \cdot (180 + 2\beta)/180) + r_2 \cdot (\pi \cdot (180 - 2\beta)/180) + 2 \cdot (r_1 + r_2) \cdot \cos \beta$ for $r_2 \geq r_1$ $C = r_2 \cdot (\pi \cdot (180 + 2\beta)/180) + r_1 \cdot (\pi \cdot (180 - 2\beta)/180) + 2 \cdot (r_1 + r_2) \cdot \cos \beta$ Therefore, starting from predetermined values of the diameter of the electrical conductor and the optical cable, the above condition on the binding force can be satisfied by an opportune selection of the parameters N, T and P. The above-mentioned value of binding force can be obtained for example with a number N of binders greater than 2, a tension T of at least 1 kg and a pitch P of each single binder of at most 200 mm.

The lashing binders are preferably of dielectric material. Lashing binders of stainless steel wires, already used in the past for this kind of application, have the drawback of causing fault damages when a broken lashing wire contact a phase conductor along the cable route.

This invention therefore relates to an optical aerial line comprising an optical cable extending parallel to an aerial electrical conductor and lashed to the electrical conductor by means of securing elements, wherein the securing elements comprise at least two binders helically wound around the electrical conductor and the optical cable, and wherein the number of said binders, the tension of application of said binders and the binder winding pitch are selected so as to have a binding force for unit length of the electrical conductor of at least 5 kg/m. The electrical conductor is either a ground conductor or a phase conductor of a power aerial line.

Preferably, the binder winding pitch is of at most 200 mm, more preferably between 100 mm and 200 mm.

The tension of application of said binders is preferably comprised between 1 and 10 kg, more preferably comprised between 2 and 5 kg.

The number of binders is greater than two, more preferably equal to three or four.

The diameter of the electrical conductor is preferably between 7 and 30 mm.

The diameter of the optical cable is preferably between 3 and 30 mm, more preferably between 8 and 18 mm.

The binders are preferably made of a dielectric material. Moreover, the binders preferably comprise aramid or glass yarns and, advantageously, are coated with a polymeric material.

The present invention further relates to a method of installing an optical aerial line, comprising arranging an optical cable parallel to an aerial electrical conductor and lashing the optical cable to the electrical conductor, wherein lashing the optical cable comprises helically winding a plurality of binders around the electrical conductor and the optical cable, and wherein the number of said binders, the tension of application of said binders and the binder winding pitch are selected so as to have a binding force per unit length of the electrical conductor of at least 5 kg/m.

The number of binders is preferably greater than 2, the tension of application of said binders is preferably of at least 2 kg and the binding pitch of each single binder is of at most 200 mm.

BRIEF DESCRIPTION OF THE DRAWINGS

Further details may be found in the following description, which refers to the appended figures listed here.

DETAILED DESCRIPTION OF THE INVENTION

Figure 1:
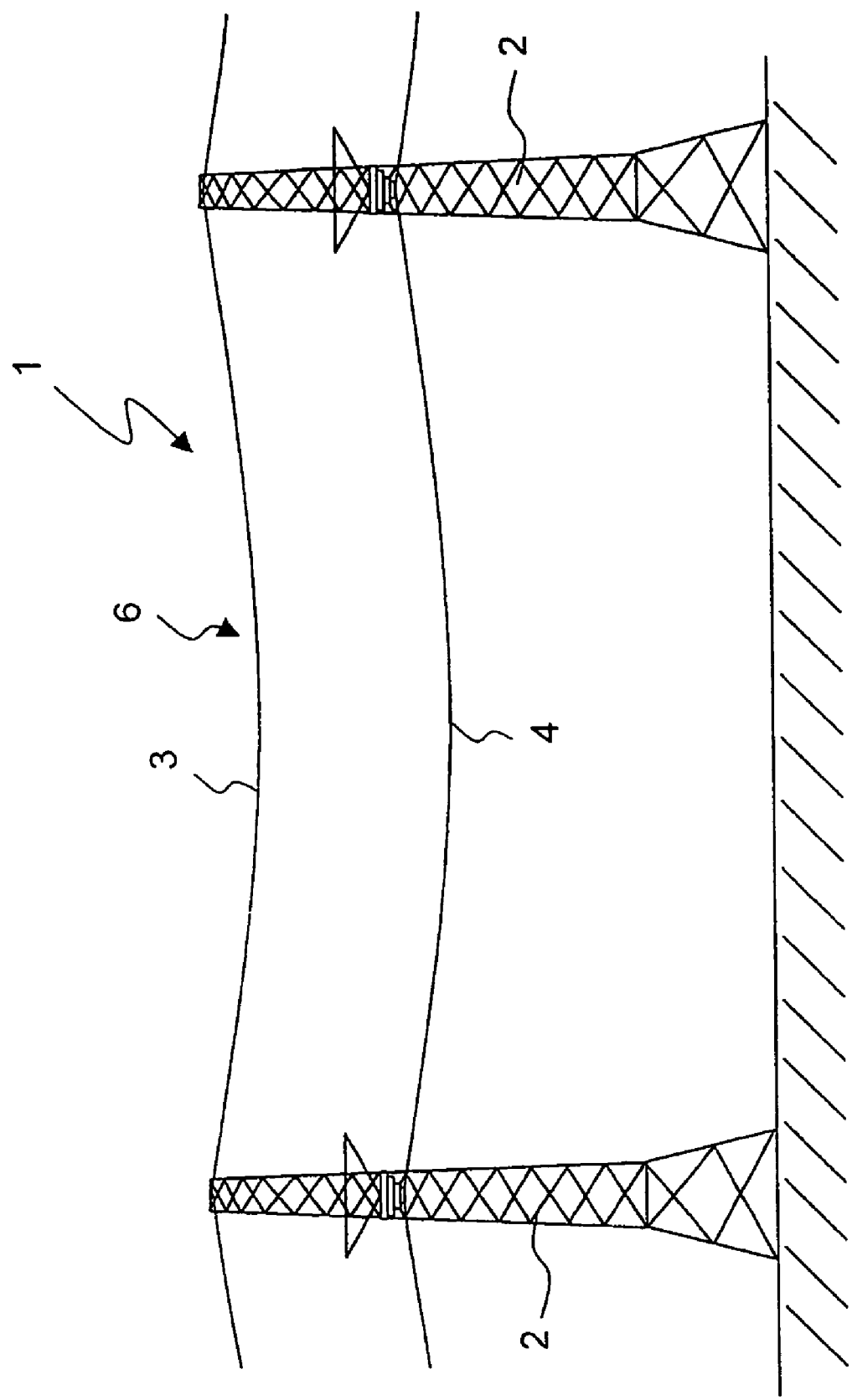
FIG. 1 illustrates a power overhead line holding an optical aerial line.

With reference to FIG. 1, a power overhead line 1 comprises a plurality of pylons (or towers) 2, a ground cable 3 fitted at the top of the pylons 2 and at least three phase cables 4 which are fastened, for example, to cross arms in a conventional manner, by insulators. The power overhead line 1 may be a high-voltage line or a low or medium-voltage line.

An optical aerial line 6 is associated to the power overhead line 1.

Figure 2:
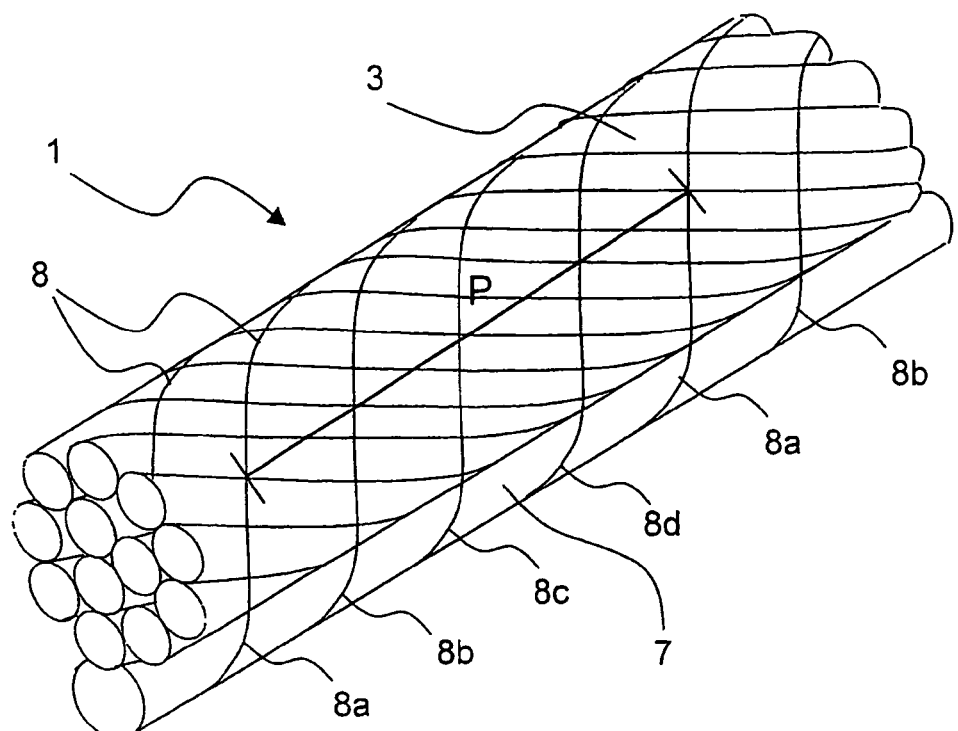
FIG. 2 shows part of the optical aerial line of FIG. 1, including an optical cable fastened to a power conductor in accordance to the present invention.

With reference to FIG. 2, the optical aerial line 6 comprises an optical cable 7, which is fastened to an electrical conductor (or messenger wire) of the power overhead line 1.

If the power overhead line 1 is a high-voltage line, the optical cable 7 is preferably coupled to the ground cable 3 (as in the illustrated example), while if the power overhead line 1 is a low or medium-voltage line, the optical cable 7 is preferably coupled to one of the phase cables 4.

The optical/electrical assembly formed by the electrical conductor 3 and the optical cable 7 is kept tight by securing elements 8 of dielectric material, wound in a helical manner.

The electrical conductor 3 has a diameter preferably comprised between 7 and 30 mm and the optical cable 7, which is preferably of a central or stranded buffer tubes design, has an outer diameter preferably comprised between 3 and 30 mm, more preferably comprised between 8 and 18 mm. Optical cable 7 contains a number of optical fibers preferably comprised between 12 and 144.

The securing elements 8 comprise a predetermined number N of lashing binders 8a, 8b, 8c, 8d (four in the illustrated example), helically wound around the electrical conductor 2 and the optical cable 3y preferably evenly spaced.

The lashing binders 8a, 8b, 8c, 8d are preferably made of yarns of dielectric material, for example multi-strand aramid or glass yarns coated with a polymeric jacket, preferably a jacket of the same material as typically used in the optical cable sheath. Said dielectric material shall be resistant to high temperatures, preferably resistant to temperatures of 200° C. or higher for some seconds, and to temperatures of more than 120° C. for a long period. Moreover, said dielectric material shall be resistant to UV radiation.

Figure 3:
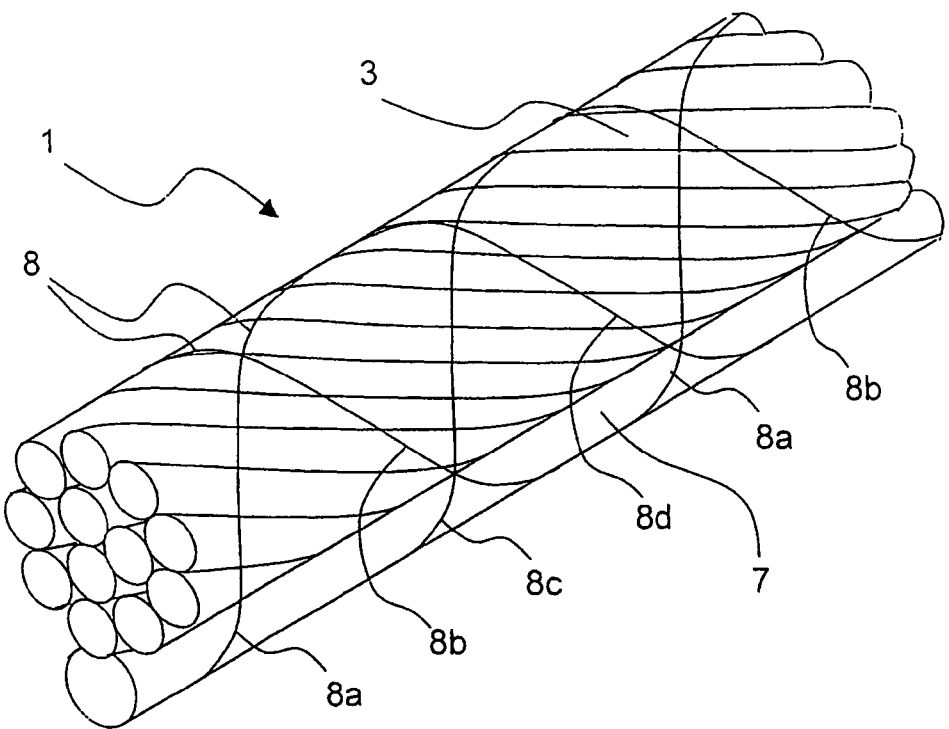
FIG. 3 shows an alternative way of fastening the optical cable to the electrical conductor.

In the embodiment of FIG. 2, the lashing binders 8a-8d are wound in a same direction. In the alternative embodiment of FIG. 3, the lashing binders 8a-8d are wound partly clockwise and partly counterclockwise, so as to cross each other along the respective paths. Preferably, the number of binders wound clockwise is equal to the number of binders wound counterclockwise. In the illustrated example, two binders (4a, 4c) are wound in one direction and two other binders 4b, 4d are wound in the opposite direction.

The number N of binders is at least two for safety reasons. However, the Applicant has verified that, to apply a suitable coupling strength, a number of binders of at least three is preferred. A number of binders higher than four, although suitable for further increasing the coupling strength, can introduce an excessive complexity in the installation apparatus and process.

The Applicant has observed that if the optical cable 7 is no coupled to the electrical conductor 3 with a sufficient strength, the optical cable 7 may be subjected to lateral displacements, for example in case of strong wind. A displacement of the optical cable 7 is undesired in that it affects the structural geometry of the line with related drawbacks, such as for example an increased tendency to ice formation and to oscillation phenomena ("galloping").

The Applicant has found that displacements of the optical cable can be avoided by securing the optical cable to the electrical conductor with a binding force greater than about 5 kg/m.

Figure 4:
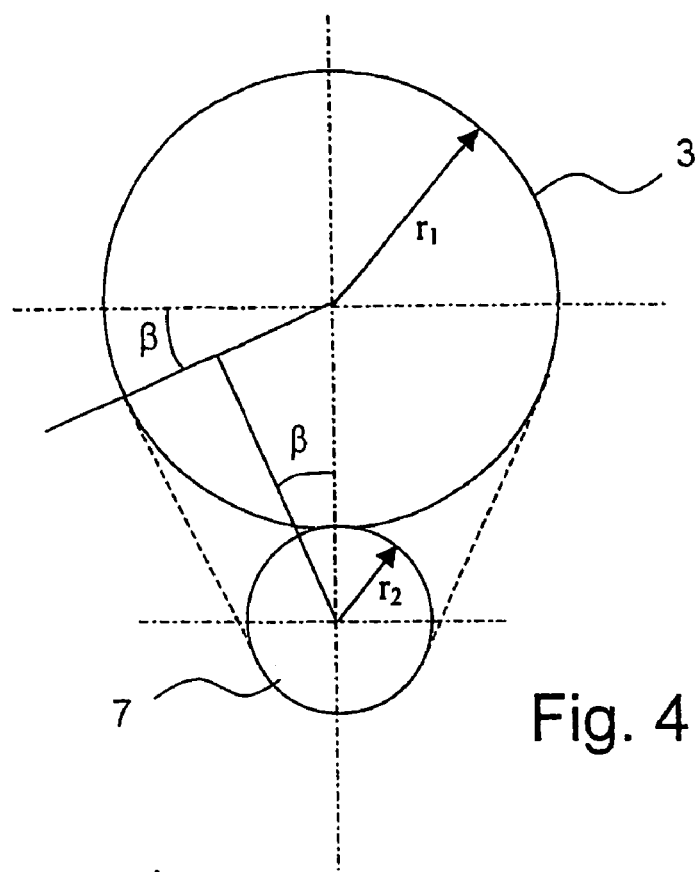
FIG. 4 shows a cross-section of the assembly formed by the power conductor and the optical cable.

The binding force F [kg/m] can be so expressed:

$$F = N \cdot (2T/P) \cdot \sin \alpha \cdot \cos \beta$$

where:

N is the number of binders;

T [kg] is the tension of application of the binders;

P [m] is the winding pitch of the binders;

$\alpha$ is the winding angle of the binder; and $\beta$ is the angle between the plane tangent to the outer surfaces of the two cables and the plane containing the longitudinal axis of said cables, as shown in FIG. 4.

The parameter $\beta$ can be in turn expressed as:

$$\beta = \text{Arc} \sin(|r_2 - r_1|/(r_1 + r_2))$$

where $r_1$ is the radius of the optical cable and $r_2$ is the radius of the electrical conductor.

The parameter $\alpha$ is related to the winding pitch of the binders and to the perimeter C of the 8-shaped cross section of the electrical conductor/optical cable assembly, according to the following formulas:

$$\alpha = \text{Arc} \tan(C/P)$$

where:

for $r_1 \geq r_2$  $C = r_1 \cdot (\pi \cdot (180 + 2\beta)/180) + r_2 \cdot (\pi \cdot (180 - 2\beta)/180) + 2 \cdot (r_1 + r_2) \cdot \cos \beta$ for $r_2 \geq r_1$  $C = r_2 \cdot (\pi \cdot (180 + 2\beta)/180) + r_1 \cdot (\pi \cdot (180 - 2\beta)/180) + 2 \cdot (r_1 + r_2) \cdot \cos \beta$ Therefore, starting from predetermined values of the diameter of the electrical conductor and the optical cable, the above condition on the binding force can be satisfied by an opportune selection of the parameters N, T and P. The above-mentioned value of binding force can be obtained for example with a number N of binders greater than 2, a tension T of at least 1 kg and a pitch P of each single binder of at most 200 mm. Preferably, the tension T is comprised between 1 and 10 kg, more preferably between 2 and 5 kg.

In an example of realization o the optical cable/electrical conductor assembly according to the present invention, the value of the parameters were the following:

$r_1 = 4$ mm;

$r_2 = 4.55$ mm;

T=2 kg;

N=4;

P=180 mm;

and the resulting binding force F were 21 kg/m.

Figure 5:
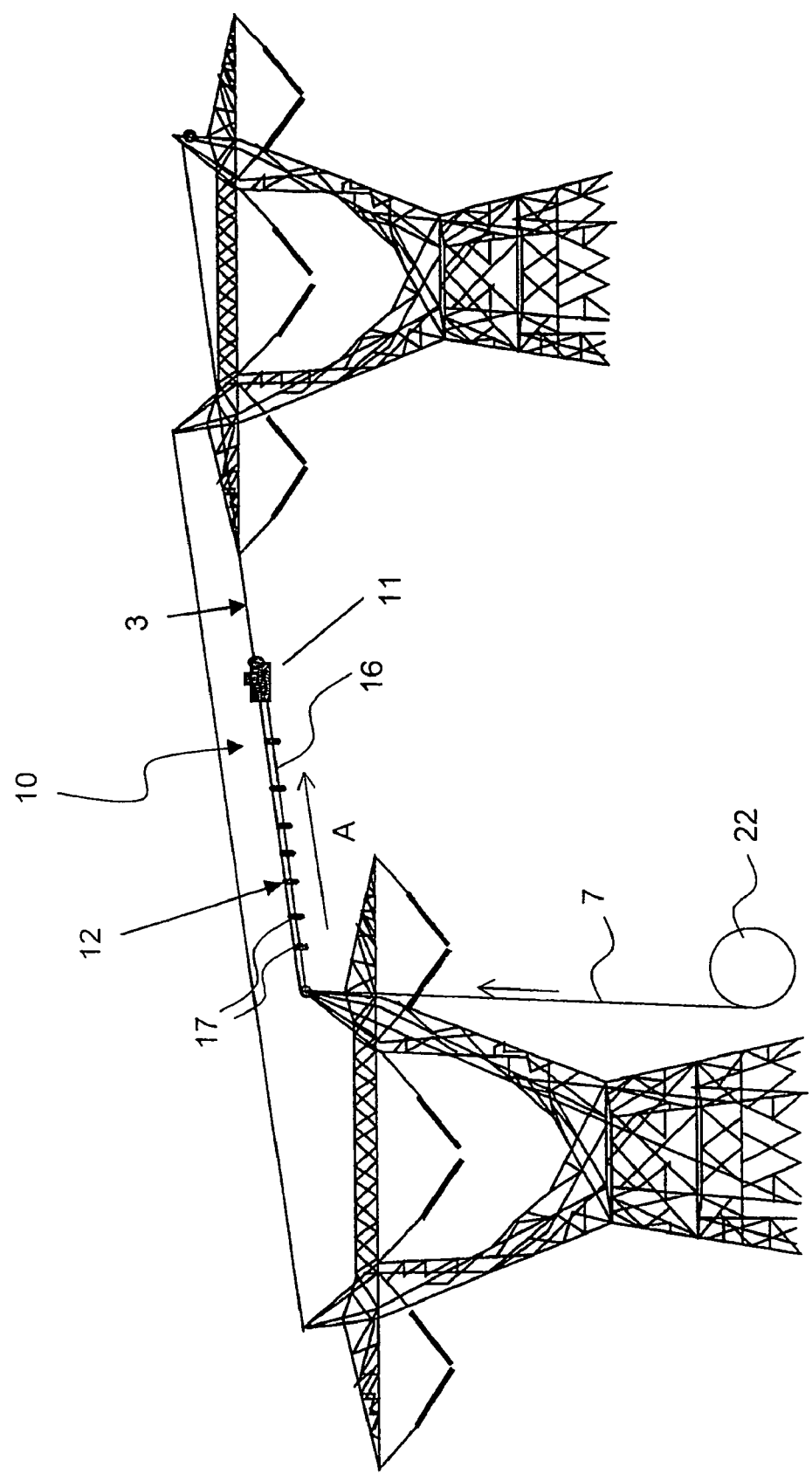
FIGS. 5 and 6 show the power overhead line 1 during the process of installation of the optical aerial line.
Figure 6:
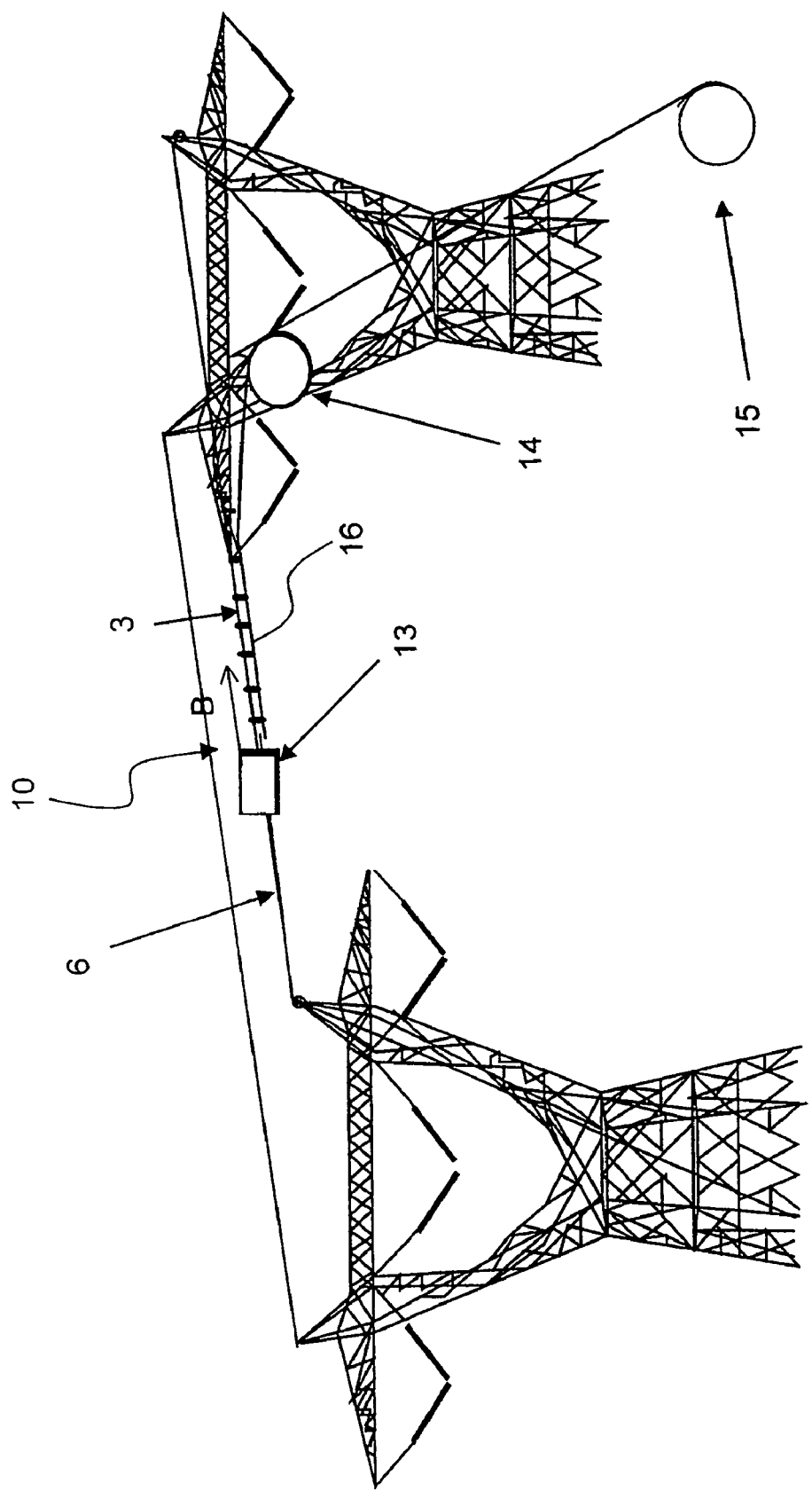

With reference to FIGS. 5 and 6, an installation apparatus 10, suitable to install the optical aerial line 6, comprises a remote-controlled tractor machine 11, a double-block assembly 12, a binder machine (or lasher) 13 and a cable feeding assembly comprising a pulley 14, a winch 15 and a drum 22 of optical cable.

The double-block assembly 12 comprises a rope 16 and a set of double blocks 17 that, during installation, are evenly distributed along the rope 16. The double blocks 17 are supporting members provided with guiding pulleys and suitable to hold the optical cable 7 close to the electrical conductor 3.

Figure 7:
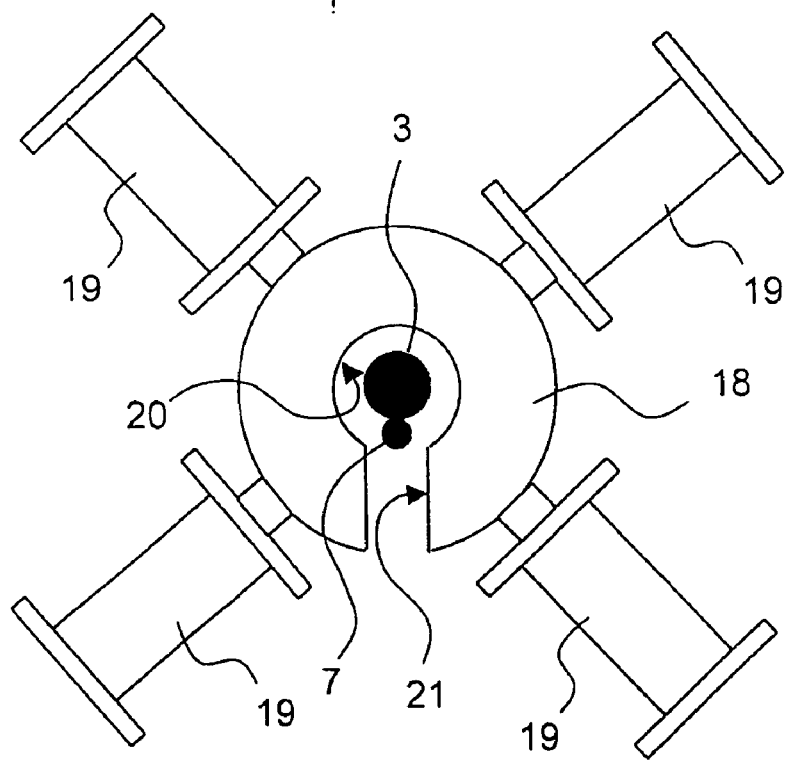
FIG. 7 relates to a component of an apparatus for installing the aerial optical line.

With reference to FIG. 7, the binder machine 13 comprises a cylindrical body 18 and a plurality of binder reels 19 held by the cylindrical body 18 and evenly arranged around the cylindrical body. The binder reels 19 are in a number corresponding to the number of binders 8 to be applied. The cylindrical central body 18 has a central bore 20 and a radial opening 21 allowing application of the body 18 onto the conductor 3.

The optical aerial line 6 may be installed as follows.

In the present example, it is assumed that the optical cable 7 has to be lashed to the ground cable 3 in the direction of arrow A, from left to right.

The installation process starts by lifting the tractor machine 11 up to the electrical conductor 3 close to the pylon on the left in FIG. 5. The optical cable 7 (pulled from the drum 22 positioned on the ground) and the rope 16 are attached to the tractor machine 11.

An operator at the ground level activates the tractor machine 11 via a radio controlled command, so that the tractor machine 11 starts to move (towards the right in FIG. 5). As the tractor machine 11 moves, an operator positioned at the existing cable level applies the double blocks 17 to hold the optical cable 7 close to the electrical conductor 3.

As the tractor machine 11 arrives at the next pylon (on the right in FIG. 4), the tractor machine 11 is stopped. An operator passes the tractor machine 11 and the optical cable 7 to the next span, then attaches the rope, and the process continues as above. The same operations are repeated on the following spans.

Once the optical cable 7 of the drum 22 has been completely stringed, the rope 16 from one end is attached to the winch 15, while the other end is attached to the binder machine 13, which has been previously lifted up to the electrical conductor 3 close to the first pylon. The winch 15 starts to pull the rope 16, and consequently at the other end the binder machine 13 starts to move (from left to right in FIG. 6, as indicated by arrow B). As the binder machine 13 moves, the reels 19 rotate about the longitudinal axis of the machine, so that the binder yarns 8 are helically wound onto the optical cable 7 and the electrical conductor 3.

As the binder machine 13 arrives at the next pylon, the winch 15 is stopped. Special hardware accessories of a known type (not shown) are provided at both ends of the span for locking the optical cable 7 and the binder yarns 8. Then an operator passes the binder machine 13 and the rope 16 to the next span and the process continues as above. The same operations are repeated on the following spans.

The invention claimed is:

1. An optical aerial line comprising an optical cable extending parallel to an aerial electrical conductor and lashed to the electrical conductor by means of securing elements, the securing elements comprising at least two non-adhesive binders helically wound around the electrical conductor and the optical cable, the number of said binders, the tension of application of said binders, and binder winding pitch being selected so as to have a binding force for unit length of the electrical conductor of at least 5 kg/m.

2. The optical aerial line of claim 1, wherein the binder winding pitch is at most 200 mm.

3. The optical aerial line of claim 2, wherein the binder winding pitch is between 100 mm and 200 mm.

4. The optical aerial line of claim 1, wherein the tension of application of said binders is between 1 and 10 kg.

5. The optical aerial line of claim 4, wherein the tension of application of said binders is between 2 and 5 kg.

6. The optical aerial line of claim 1, wherein the number of binders is greater than two.

7. The optical aerial line of claim 1, wherein the number of binders is three or four.

8. The optical aerial line of claim 1, wherein the electrical conductor has a diameter between 7 and 30 mm.

9. The optical aerial line of claim 1, wherein the optical cable has a diameter between 3 and 30 mm.

10. The optical aerial line of claim 9, wherein the optical cable has a diameter between 8 and 18 mm.

11. The optical aerial line of claim 1, wherein said binders are made of a dielectric material.

12. The optical aerial line of claim 11, wherein said binders comprise aramid or glass yarns.

13. The optical aerial line of claim 11, wherein said binders are coated with a polymeric material.

14. The optical aerial line of claim 11, wherein part of said binders is wound in one direction and part in the opposite direction.

15. A method of installing an optical aerial line, comprising arranging an optical cable parallel to an aerial electrical conductor and lashing the optical cable to the electrical conductor, wherein lashing the optical cable comprises helically winding a plurality of non-adhesive binders around the electrical conductor and the optical cable, and wherein the number of said binders, the tension of application of said binders and the binder winding pitch are selected so as to have a binding force per unit length of the electrical conductor of at least 5 kg/m.

16. The method of claim 15, wherein the number of binders is greater than 2.

17. The method of claim 15, wherein the tension of application of said binders is at least 2 kg.

18. The method of claim 15, wherein the binding winding pitch of each single binder is at most 200 mm.

\* \* \* \* \*